United States Patent [19]

Sivalingham

[11] Patent Number: 4,667,537
[45] Date of Patent: May 26, 1987

[54] TWO SPEED ACCESSORY DRIVE

[75] Inventor: Ramalingam Sivalingham, Chatham, Canada

[73] Assignee: Canadian Fram Limited, Chatham, Canada

[21] Appl. No.: 739,244

[22] Filed: May 30, 1985

[51] Int. Cl.$^4$ .............................................. F16H 3/74
[52] U.S. Cl. ..................................... 74/752 E; 74/785
[58] Field of Search ................... 74/752 E, 751, 785, 74/786, 787; 192/103 B

[56] References Cited

U.S. PATENT DOCUMENTS

| | | | |
|---|---|---|---|
| 2,167,953 | 8/1939 | Lafleche | 74/752 E |
| 2,636,401 | 4/1953 | Gubelmann | 74/752 E |
| 2,649,817 | 8/1953 | La Vogue | 74/785 |
| 2,673,633 | 3/1954 | Miller et al. | 74/752 E X |
| 2,749,772 | 6/1956 | O'Malley | 74/785 X |
| 2,763,162 | 9/1956 | Herndon | 74/785 X |
| 2,943,517 | 7/1960 | Markley et al. | 74/750 |
| 3,396,610 | 8/1968 | Rich, Jr. et al. | 74/785 X |
| 3,763,978 | 10/1973 | Crooks | 192/4 A |
| 3,797,331 | 3/1974 | Kjeldsteen | 74/752 E |
| 4,273,008 | 6/1981 | Ishihara et al. | 74/752 E |
| 4,412,460 | 11/1983 | Barthelemy | 74/752 E |
| 4,450,735 | 5/1984 | Koivenen et al. | 74/752 E X |
| 4,484,495 | 11/1984 | Mason | 74/785 |

FOREIGN PATENT DOCUMENTS

| | | |
|---|---|---|
| 0016710 | 10/1980 | European Pat. Off. . |
| 0128311 | 12/1984 | European Pat. Off. . |
| 3313191 | 11/1983 | Fed. Rep. of Germany . |
| 2484927 | 12/1981 | France . |
| 2091357 | 7/1982 | United Kingdom . |

OTHER PUBLICATIONS

Mechanisms, Linkages, and Mechanical Controls, Chironis et al., 1965, p. 251, (Simple Planetaries and Inversions).

Primary Examiner—Leslie Braun
Assistant Examiner—Martin G. Belisario
Attorney, Agent, or Firm—Markell Seitzman; Russel C. Wells

[57] ABSTRACT

A two speed accessory drive primarily for rotating engine driven accessories at either of two selectible speeds. The drive includes a drum rotatable with an input shaft. Positioned within the drum are a plurality of self-activating brake shoes that are moved into and out of engagement with the drum by a corresponding set of levers. The motion of the levers is controlled by the relative rotation between a plurality of disks positioned remote from the drum.

8 Claims, 7 Drawing Figures

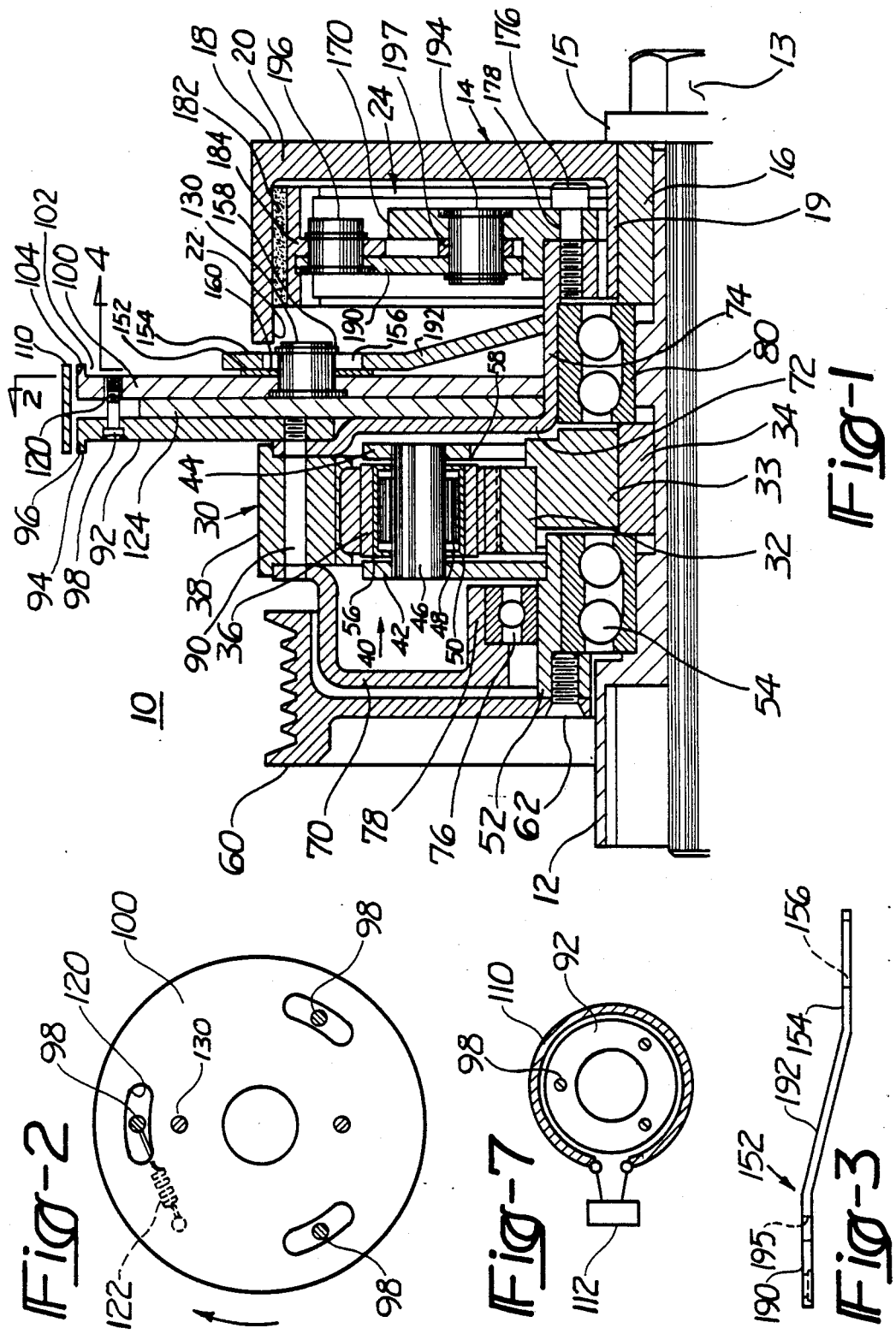

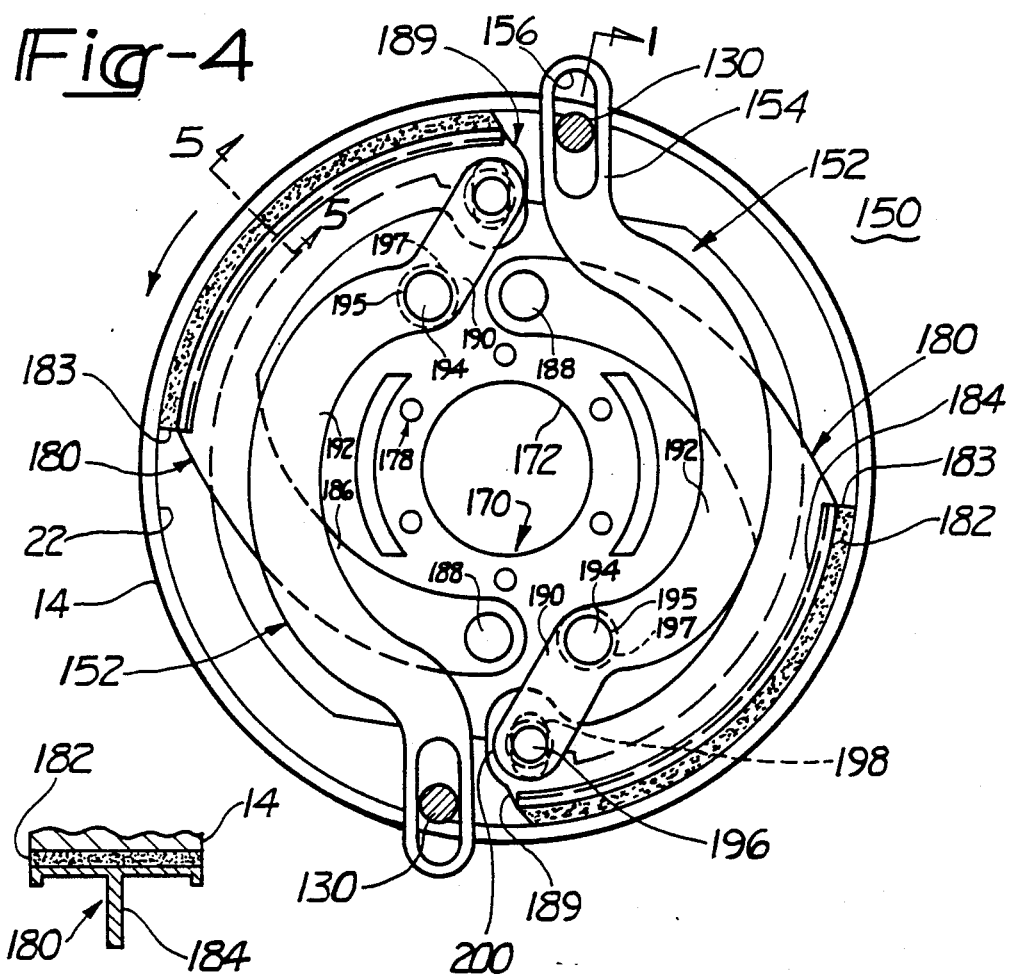
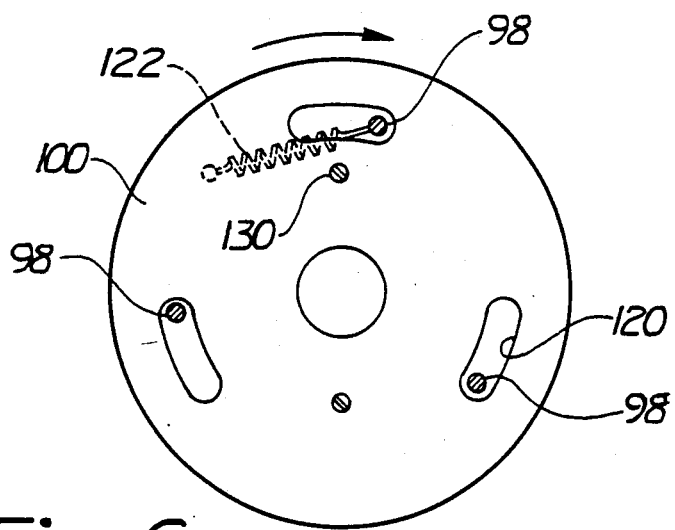

TWO SPEED ACCESSORY DRIVE

BACKGROUND AND SUMMARY OF THE INVENTION

The present invention relates to a two-speed accessory drive for use in driving a plurality of engine accessories at either one of two selected predetermined speed ratios relative to the spped of an input shaft. More particularly the invention relates to an accessory drive which utilizes internally expanding, centrifugally responsive, lever actuated brake shoes.

The present invention finds application for activating a plurality of engine driven accessories by utilizing a drive or clutching device which utilizes a plurality of internally expanding, self energizing brake shoes. An advantage of utilizing the internally expanding brake shoes in conjunction with its operating mechanism as described below is to remove any thrust loading on the various bearings of the drive. The self energizing feature of the present invention permits the drive to be activated by using a minimum actuating force. Prior two speed accessory drives are configured to drive the associated accessories at a first speed relatively equal to the speed of the input shaft or engine and a at second or higher speed as a function of the operating characteristics of the engine. These prior devices are characterized by an excessively high degree of gear whine which is generated by a planetary gear set which is often used within such devices. In contrast the present invention provides an efficient and quietly operating two speed drive. Another object of the present invention is to control the effective gear ratio of a planetary gear set through the application of a plurality of internally expanding, self-energizing brake shoes. Accordingly it is an object of the present invention to provide a drive or clutching device that is capable of driving accessories at either of two preselected speeds. Accordingly, the invention comprises: a two speed accessory drive operative to drive an output member at either of two predetermined speeds relative to the speed of input member or shaft. The drive comprises a drum rotatable with the input shaft and includes an engagement surface. A planetary gear set is positioned remote from the drum and comprises a sun gear, a plurality of planet gears drivingly linked to the sun gear and supported by a planet carrier and a ring gear driving positioned about the planet gears. The sun gear is drivingly connected to the input shaFt and the planet carrier is operatively connected to the output member. The drive further includes means for rotationally isolating the planet carrier and the output member from the input shaft and engagement means comprising: a shoe disk positioned within the drum and drivingly connected to the ring gear. The engagement means further includes a plurality of centrifugal acting, brake shoes rotatable with and pivotably supported relative to the shoe disk and means for moving the brake shoes to a first or engaged condition to engage the brake shoes to the drum and for moving the brake shoes to a second or disengaged condition to disengage the brake shoes from the drum, and a plurality of levers one for each brake shoe, pivotably connected to and for moving a corresponding one of the brake shoes. The engagement means also includes means for moving the levers relative to the shoe disk to move the brake shoes to the first and second conditions. The drive further includes means for selectively stopping the rotation of the ring gear during instances where the brake shoes are disengaged from the drum for permitting the planet carrier to rotate at a speed less than the speed of the input shaft.

BRIEF DESCRIPTION OF THE DRAWINGS

In the drawings:

FIG. 1 illustrates a cross-sectional view of the present invention.

FIG. 2 illustrates a cross-sectional view taken through section 2—2 of FIG. 1 and shows the relationship of two disks during the high speed mode of operation.

FIG. 3 illustrates a cross-sectional view of a lever used within the invention.

FIG. 4 illustrates a cross-sectional of an engagement mechanism utilized.

FIG. 5 is a cross-sectional veiw through section 5—5 of FIG. 4.

FIG. 6 shows the relationship of two disks utilized in the present invention during the low speed mode of operation.

FIG. 7 schematically illustrates an actuator for a band brake.

DETAILED DESCRIPTION OF THE DRAWINGS

With reference to FIG. 1 there is illustrated a two speed accessory drive 10 comprising an input shaft 12 secured to an engine by a bolt 13 and washer 15. A drum generally indicated as 14 is supported by the shaft 12 and driven through a key 16. The drum 14 includes a radially extending portion 18 linked to a central portion 19, which is connected to the key 16, and an axially extending portion 20. The axially extending portion includes an inner or engagement surface 22. The axially extending portions 19 and 20 and the radially extending portion 18 cooperate to define a partially enclosed volume generally designated as 24.

The drive 10 further includes a planetary gear set generally designated as 30. The planetary gear set 30 comprises a sun gear 32 positioned about the input shaft 12 and driven by the shaft 12 through another key 34 and cylindrical spacer 33. The planetary gear set 30 further includes a plurality of planet gears 36 positioned about and in driving engagement with the sun gear 32 and a ring gear 38 positioned about and in driving engagement with each of the planet gears 36. The planet gears 36 are supported by a planet carrier generally shows as 40. The planet carrier 40 comprises a plurality of annular disks 42 and 44. The disks 42 and 44 support a pin 46, one for each planetary gear 36. Each planetary gear 36 is supported relative to its corresponding pin 46 by a needle bearing 48 comprising an outer race 50 attached to an inner surface of its respective planet gear 36. Positioned between the disks 42 and 44, on either side of a respective planet gear, are thrust washers generally designated as 56 and 58. The disk 42 is supported by a cylindrical spacer 52 which in turn is supported relative to the shaft 12 by a bearing 54. Attached to the cylindrical spacer 52 is an output pulley 60. The output pulley 60 may be attached to the cylindrical spacer by known means such as a plurality of bolts 62 only one of which is shown in FIG. 1. While the preferred embodiment of the invention illustrates a drive 10 in which the planet carrier 40 drives the output pulley 60 the invention is not so limited. The output pulley 60 may be driven by any of the three major components of the planetary gear set 30.

Attached to the ring gear 38 is a front cover 70 and a rear cover 72. The covers 70 and 72 respectively protect and enclose the planetary gear set 30. The front cover 70 comprises an axially extending cylindrical flange 78 which is supported by a bearing 76. In this manner the front cover 70 is isolated from the cylindrical spacer 52 and input shaft 12. The rear cover 72 includes an axially extending cylindrical flange 74 which is rotationally isolated from the input shaft 12 by another bearing 80.

Attached to the rear cover 72 by means of a plurality of bolts 90 is an annular disk 92. The annular disk 92 terminates at an axially extending portion 94 which defines an outer engagement surface 96. The bolts 90 also serve to connect the covers 70 and 72 to the ring gear 38. The annular disk 92 comprises a plurality of axially extending pins 98 which may be positioned uniformally thereon. As illustrated in FIG. 2 the annular disk 92 comprises three such pins 98 only one of which is illustrated in FIG. 1.

The drive 10 further includes a second annular disk 100 which is rotatably positioned about the cylindrical flange 74 of the rear cover 72. The outside diameter of this second disk 100 is the same as the outside diameter of the first disk 92. The disk 100 includes an axial extension 102 defining an outer engagement surface 104. Positioned for engagement with the outer engagement surfaces 96 and 104 of the first and second disks 92 and 100 respectively is a brake means such as a flexible metal band 110 which is engaged by means of a coacting actuator 112 of a known variety, such as a solenoid actuating mechanism to prevent the rotation of the disks and the other components of the drive 10 attached thereto such as the ring gear 38. An exemplary relationship among the actuator 112, band 110 and disk 92 is schematically illustrated in FIG. 7. the second disk 100 further includes a plurality of arcuately shaped slots 120 equal in number to the number of pins 98 extending from the first disk 92. These pins 98 extend through a corresponding one of the slots 120. The relationship between the pins and the slots is illustrated in both FIGS. 1, 2 and 6.

As can be seen from FIG. 2, the arcuate slots 120 permit the second disk 100 to rotate a limited amount relative to the first disk 92. In order to return the disks 92 and 100 to their preferred nominal orientation it is desirable to incorporate into the system 10 means for returning the disks 92 and 100 to such position. Such means may be accomplished by connecting a spring 122 between at least one of the pins 98 and the second disk 100. The operational relationship between the slots 120, spring 122 and pins 98 is discussed in greater detail below. Further, it can be seen that as the rear cover 72, ring gear 38 and first disk 92 are rotated under control of the other components of the drive 10, the spring 122 functions as a means for dragging or rotating the second disk 100 along with the disk 92.

Positioned between the disks 92 and 100 and about the cylindrical flange 74 of the rear cover 72 is a third disk 124 which is fabricated of a material having a low coefficient of friction. This third disk 124 functions as a spacer between the first disk 92 and the second disk 100.

The second disk 100 includes a plurality of axially extending pins 130 shown in FIGS. 1 and 4. Each of these pins 130 rotates a lever 152 which is utilized to place a corresponding brake shoe 180 into frictional engagement with the engagement surface 22 of the drum 14. In the preferred embodiment of the invention two such levers 152 are used. However, FIG. 1 only illustrates the connection of one such pin 130 to one of the levers 152. The levers are more clearly illustrated in FIGS. 3 and 4.

As can be seen from FIGS. 3 and 4 each lever 152 comprises an arcuately shaped linkage mechanism. Each lever terminates at an elongated portion 154 which extends substantially radially outward from the center of the drive 10. This elongated portion 154 includes an oval shaped slot 156. The oval shaped slot 156 is sized to slidably receive one of the pins 130 as illustrated in FIGS. 1 and 4. A lock washer 158, illustrated only in FIG. 1, secures the lever 152 to its corresponding pin 130. Each pin 130 and oval slot 156 permit its corresponding lever 152 to rotate with and to slide substantially radially relative to the second disk 100. A washer generally designated as 160 is received about each of the pins 130 and is positioned between the second disk 100 and the elongated portion 154 of the lever 152. As can be seen from FIGS. 1 and 3 the levers 152 are bent thereby permitting them to extend from the second disk 100 into the partially enclosed volume 24 for engagement with other components of the drive 10.

The levers 152 comprises a portion of an engagement or clutching means generally designated as 150 in FIG. 4. The engagement means further comprises a shoe disk 170. The shoe disk 170 comprises a substantially circular, annular member having a circular opening 172. It should be noted that for clarity purposes FIG. 4 does not illustrate the central portion of the drum 14, the key 16 and shaft 12 which are positioned internal to the opening 172. These components however are shown in FIG. 1. The shoe disk 170 is positioned with the volume 24 and concentrically positioned about the input shaft 12 and the central, axially extending portion 19 of the drum 14. The shoe disk 170 is effectively fastened to the ring gear 38 by connection to the axially extending cylindrical flange 74 of the rear cover 72 by a plurality of bolts 176. The bolts 176 are received through a like plurality of bolt holes 178. For purpose of clarity the bolts 176 are similarly not illustrated in FIG. 4.

The engagement means 150 further includes a plurality of arcuately shaped brake shoes generally shown as 180 that are formed for engagement with the surface 22 of the drum 14. A cross-sectional view of a brake shoe 180 in contact with the surface 22 is illustrated in FIG. 5. Each brake shoe 180 comprises a band of friction material 182 bonded or otherwise attached to a shoe support 184. Each shoe support 184 comprises an inwardly extending curved link 186 which is rotationally secured to the shoe disk 170 by a link pin 188. The opposite end 189 of each shoe support 184 is attached to an extending portion 190 of the lever 152. The extending portion 190 of the lever 152 is situated substantially opposite the elongated portion 154. Joining the extending portion 190 and the elongated portion 154 is an arcuately shaped linkage member 192. The linkage member 192 is bent thereby permitting the lever 152 to extend axially as mentioned above. In addition, each lever 152 is pivotably connected to the shoe disk 170 by a link pin 194 which is received through an opening 195 and which joins the lever 152 at the junction of the arcuately shaped linkage member 192 and the extending portion 190. The lever 152 is spaced from the shoe disk 170 by a washer 197. The extending portion 190 of each lever 152 is pivotably attached to its corresponding shoe support 184 by another pin 196. The pin 196 passes through a radially extending oval shaped opening 198 formed in a radially extending portion 200 of the shoe support 184. As can be seen from FIG. 4, as each lever 152 is rotated by the action of the pins 130 extending from the second disk 100 to cause the brake shoes 180 to selectively rotate into or out of engagement with the surface 22 of the drum 14.

The two speed accessory drive 10 has two modes of operation. A first high speed mode of operation in which the output pulley 60 is rotated at the speed of the input shaft 12 and a second mode in which the output pulley 60 is rotated at a speed less than the speed of the input shaft. Further, during the high speed mode of operation the engagement or clutching means 150 shown in FIG. 4 is controlled such that the brake shoes 180 are in engagement with the surface 22 of the drum 14. Such condition is specifically illustrated in FIG. 4. During the second or low speed mode of operation the levers 152 of the engagement means 150 are moved to place the brake shoes 180 apart from the drum 14. In its preferred operating environment the first or high speed mode of operation is utilized for engine speeds typically below a nominal value such as 1200 rpm and the low speed mode of operation being effective for engine speeds thereabove.

During the operation of the drive the engine speed is monitored by known means. By way of illustration let it be assumed that the drive 10 had been operating in its second or low speed mode of operation (which corresponds to the higher range of engine speeds) with the brake shoes 180 positioned apart from the drum 14 and further let it be assumed that the engine speed is now reduced. Once the engine speed has been reduced below the nominal value, a signal is communicated to the actuator 112 which releases the band brake 110 from the first and second disks 92 and 100, respectively to permit the high speed operation.

During operation of the drive 10 the drum 14 always rotates at the speed of the input shaft 12 by virtue of its connection through the key 16. The direction of rotation of the drum 14 is shown by the solid arrow in FIG. 4. It would be helpful in the understanding of the present invention to appreciate the directions of rotation of its various components. In the preferred mode of operation of the invention, the shaft 12, drum 14 and disk 92 always rotate in a clockwise direction. When viewed in FIG. 1 the tops of these various components will appear to rotate into the plane of the paper. When viewing FIG. 4 which is a section looking from the left to the right the rotation of the drum 14 shown by the solid arrow will appear counterclockwise as shown. In addition, to enter the high speed mode of operation requires that each of the levers 152 be rotated in a manner which will urge their corresponding brake shoes 180 into contact with the surface 22 of the drum 14 this situation is illustrated in FIG. 4. Upon inspection of FIG. 4 it can be seen that the levers 152 must be rotated counterclockwise relative to the shoe disk 170 to place the shoes 180 into contact with the drum 170. Similarly a clockwise rotation of the levers 152 will remove the brake shoes 180 from the drum 14.

Further, assuming that the engine speed is now below the nominal value a signal is communicated to the actuator 112 which releases the band brake 110 from the first and second disks 92 and 100 respectively. Recalling that the disk 92 is attached to the ring gear 38, the rear cover 72 and the shoe disk 170 its effective moment of inertia will be substantially greater than the effective moment of inertia of the second disk 100. Therefore, the second disk 100 (with the band 110 released) will tend to rotate to its nominal position under the urging of the spring 122. More specifically, the second disk 100 will rotate in a clockwise manner as viewed in FIG. 2 until the spring 122 has achieved its pretensioned condition or position.

Recalling that the levers 152 are attached to the disk 100 by the pins 130 and that the shoe disk 170 is rigidly attached to the disk 92, the rotation of the disk 100 will cause the levers 152 to rotate about the link pins 194 on the shoe disk 170. More particularly, the clockwise rotation of the disk 100 relative to the disk 92 will rotate the levers 152 in a clockwise direction. Such rotation however when viewed in FIG. 4 will appear as a counterclockwise rotation of the levers 152 relative to the shoe disk 170. This action causes the brake shoes 180 to engage the surface 22 of the drum 14. More specifically, as each lever 152 rotates on its corresponding link pin 194 the shoe support 184 rotates on its corresponding link pin 188 which initially places the end 183 (shown in FIG. 4) of the friction material 182 into contact with the drum 14. As can be seen from FIG. 4 since the rotation of the drum 14 is toward the link pin 188 of the shoe support 184 a frictional force will be developed between the drum 14 and the friction material 182 which further urges the brake shoe 180 into contact with the drum 14. This action is illustrative of the self energizing feature of the present invention, that is, only a relatively small amount of force is necessary to move the levers 152 to cause the brake shoes to engage the drum 14. Thereafter, the brake shoes 180 are urged into greater engagement with the drum 14 by the internal interaction between the drum 14 and the brake shoes 180.

As the rotational speed of the shoe disk 170 increases the centrifugal forces generated on the brake shoes 180 tend to urge brake shoes 180 into further contact with the drum 14 thereby increasing the available friction forces therebetween. The shoe disk 170 will thereafter rotate at the speed of the brake drum 14 (which is also the speed of the input shaft 12). Further, since the ring gear 38 is connected to the shoe disk 170 through the rear cover 72 the ring gear 38 and disk 92 will similarly rotate at the speed of the shaft 12. It should be recalled that the disk 100 is loosely received about the axially extending flange 74 of the rear cover 72 and as such is free to rotate about it. As the disk 92 rotates at shaft speed the disk 100 is dragged or rotated with it under the action of the spring 122. Further, since the sun gear 32 is similarly driven at the speed of the input shaft 12 by the spacer 33, the planetary gear set 30 will tend to rotate as a unit thereby rotating the planet carrier 40 at shaft speed. The carrier 40 will in turn rotate the output pulley 60 and those engine accessories attached thereto at the speed of the input shaft 12.

In order to reduce the speed at which the engine accessories rotate, at engine speeds above the nominal engine speed, the actuator 112 is activated thereby wrapping the band 110 about the first and second disks 92 and 100, respectively. This action will tend to slow down and stop the rotation of these disks and the ring gear 38.

It can be seen from the discussion above the effective moment of inertia of the first disk 92, by virtue of its connection to the ring gear 38, and shoe disk 170 is larger than the effective moment inertia of the second disk 100. Since the second disk 100 has a lower moment of inertia it will tend to break first and disengage the brake shoes. That is, the first disk 92 will continue to rotate slightly clockwise, before it also stops, within the slots 120 of the second disk 100 thereby extending the spring 122. Such condition is shown in FIG. 6. This rotation of the second disk 100 relative to the first disk 92 causes each of the levers 152 to effectly rotate clockwise relative to the shoe disk 170, as viewed in FIG. 4, which releases the brake shoes 180 from the drum 14. During this condition the ring gear 38 slows down due to the reaction torque produced by disengaging the brake shoes. In this case the reaction torque acts as the primary braking force to stop the ring gear 38 from rotating. Thereafter, the disks 92 and 100 are prevented from rotating by the band 110. The sun gear 32 is still permitted to rotate at the speed of the input shaft 12, the planetary gear set 30 operates to permit the planet gears 36 to rotate about the sun gear 32 which effectively reduces the speed at which the planet carrier 40 and the output member 60 and those accessories connected thereto rotate.

When it is again desired to enter the high speed mode of operation after the engine speed has been lowered below the nominal value, the actuator 112 is commanded to release the band 110 from the discs 92 and 100, respectively. This action permits the discs 92 and 100 to rotate relative to one another under the action of the spring 122 to the condition shown in FIG. 2, thereby again causing the engagement of the brake shoes 180 to the drum 14 as described above.

A further advantage achieved by configuring the present invention as described above is that the drive 10 inherently includes provision for a failure mode of operation. If for some reason the actuator 112 is inoperative thereby failing to actuate the band 110 to stop the rotation of the discs 92 and 100 the drive 10 will always operate in the high speed mode of operation. Further, it should be appreciated from the above that the levers 152, which are used to multiply the force on the brake shoes 180, may be eliminated if the torque requirements of the system are low. As an example, if the levers 152 are eliminated, the pins 130 may be used in place of the pins 196 to directly move the brake shoes 180.

Many changes and modifications in the above described embodiment of the invention can, of course, be carried out without departing from the scope thereof. Accordingly, that scope is intended to be limited only by the scope of the appended claims.

What is claimed is:

1. A two speed accessory drive operative to drive an output member at either of two predetermined speeds relative to the speed of input member or shaft comprising:

a drum rotatable with said input shaft and including an engagement surface;

a planetary gear set positioned remote from said drum comprising a sun gear, a plurality of planet gears drivingly linked to said sun gear and supported by a planet carrier and a ring gear drivingly positioned about said planet gears, said sun gear drivingly connected to said input shaft and said planet carrier operatively connected to said output member;

means for rotationally isolating said planet carrier and said output member from said input shaft;

engagement means comprising:

a shoe disk positioned within said drum and drivingly connected to said ring gear;

a plurality of centrifugal acting, braking shoes rotatable with and pivotally supported relative to said shoe disk;

means for moving said brake shoes to a first or engaged condition to engage said brake shoes to said drum for moving said brake shoes to a second or disengaged condition to disengage said brake shoes from said drum, and means for selectively stopping the rotation of said ring gear during instances where said brake shoes are disengaged from said drum for permitting said planet carrier to rotate at a speed less than the speed of the input shaft; and wherein said moving means further includes a plurality of levers one for each brake shoe, pivotally connected to a corresponding one of said brake shoes and wherein said engagement means further includes means for moving said levers relative to said shoe disk to move said brake shoes to said first and second conditions; and wherein said lever moving means further comprises a disk rotatably positioned about said input shaft including means for engagably connecting and moving said levers in a first direction to cause said brake shoes to move to said first condition.

2. The drive as defined in claim 1 wherein said said lever moving means further includes means for stopping the rotation of said disk relative to the rotation of said shoe disk to cause said levers to move in a second direction, opposite said first direction to cause said brake shoes to move to said second condition.

3. The drive as defined in claim 2 wherein said levers include an elongated portion which extends substantially radially outward from said shoe disk and includes an oblong or oval opening therein and wherein said engagably connecting means includes a plurality of pins axially extending from said disk and received through each of said oblong openings.

4. The drive as defined in claim 3 wherein said stopping means includes a band brake circumferentially positioned about said disk and an actuator means for causing said band brake to engagably envelop said disk.

5. The drive as defined in claim 4 wherein said stopping means further includes an annular disk attached to and rotatable with said ring gear having an outer diameter equal to the outer diameter of said disk and a band brake circumferentially positioned about said annular disk and said disk.

6. The drive as defined in claim 5 wherein said band brake is simultaneously applied to both said disk and said annular disk.

7. The drive as defined in claim 6 wherein said lever moving means futher includes said annular disk and wherein said disk is located proximate to and apart from said annular disk said disk further including a plurality of arcuately shaped slots each of which receive a pin extending therethrough from said annular disk, and means for applying a biasing force to said disk for causing said disk to rotate relative to said shoe disk for moving said levers to said first condition, during intervals when said band brake is not activated, thereby causing said brake shoes to move to said first condition in light engagement with said drum.

8. The drive as defined in claim 7 wherein said biasing means includes at least one spring connected between one of the said pins on said annular disk and said disk.

* * * * *